No. 892,873. PATENTED JULY 7, 1908.
N. McKEEVER.
CORN GRATER.
APPLICATION FILED JULY 19, 1907.
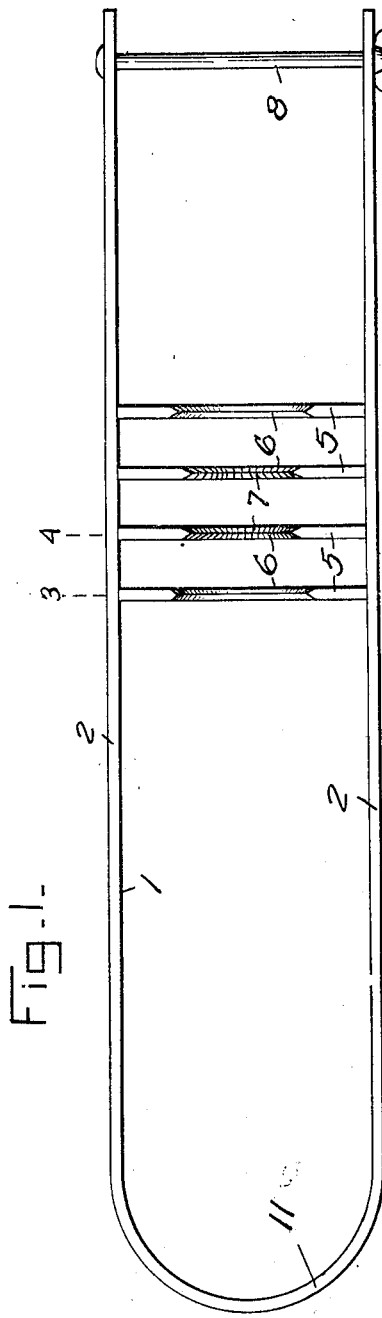
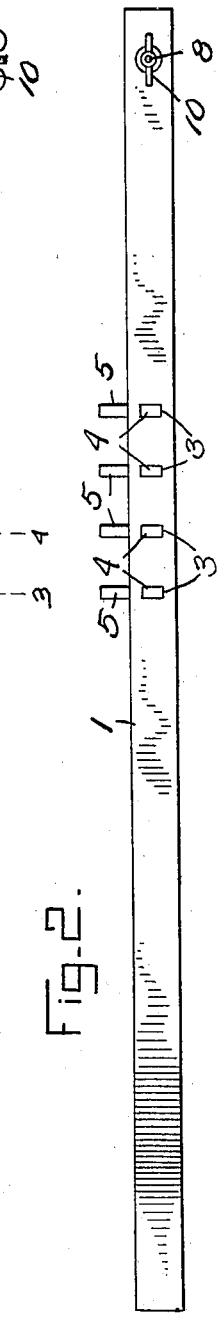
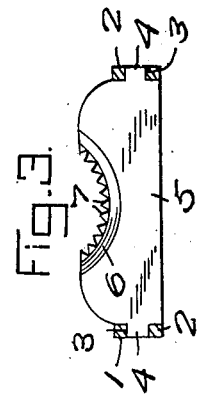
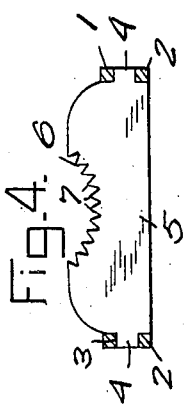
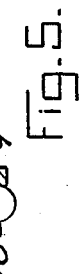
Witnesses
G. R. Thomas
E. R. Reichenbach
Inventor
Nannie McKeever,
By
Attorney

UNITED STATES PATENT OFFICE.

NANNIE McKEEVER, OF WASHINGTON, DISTRICT OF COLUMBIA.

CORN-GRATER.

No. 892,873.  Specification of Letters Patent.  Patented July 7, 1908.

Application filed July 19, 1907. Serial No. 384,660.

*To all whom it may concern:*

Be it known that I, NANNIE McKEEVER, a citizen of the United States, residing at Washington, in the District of Columbia, have invented certain new and useful Improvements in Corn-Graters, of which the following is a specification.

This invention relates to devices for grating green corn; and, in general, the object is to provide a device of this nature which will possess in high degree simplicity, cheapness, and efficiency.

The invention may be said to consist in the features of construction hereinafter claimed and embodiments of which are shown in the accompanying drawings, in which:

Figure 1 is a plan view of the device as preferably constructed; Fig. 2 is a side elevation thereof; Fig. 3 is a section on the line 3—3, Fig. 1, the blade standing in the plane of section being shown in elevation; Fig. 4 is a similar view taken on the line 4—4, Fig. 1; and Fig. 5 is a detail of the clamping rod.

Referring now to these views, 1 indicates a frame, which is preferably substantially U-shape, as shown. The side members or strips 2 of this frame are provided with a plurality of registering openings 3, within which are received lugs 4 formed on the ends of transversely-disposed scraping blades 5. The lugs and openings are so formed as to prevent rotation of the blades. These latter preferably extend above the side members of the frame; and their upper edges are provided with curved depressions 6, these depressions being in alinement and formed to correspond in general to the curvature of a corn cob. As shown the series of blades comprises four individual blades, but other number may be employed if desired. The two outer blades of the series have their curved depressions constructed as plain knife edges, whereas the curved depressions of the inner blades are toothed, as at 7. These teeth project upward above the knife edges, as clearly shown in Fig. 3, and are preferably conical or pyramidal in form. The free ends of the frame are connected by a transverse rod 8, headed at one end and provided with screw threads at the other.

A shoulder 9 in rear of the screw-threaded portion prevents the wing-nut 10 drawing the ends of the frame too closely together.

In use, the open end of the frame is placed against the bottom of a pan and the arched end 11 is held in the hand, serving as a handle. The ear of corn is then scraped back and forth over the curved depressions in the blades, and the meal and kernels are quickly freed and fall into the pan or dish. The outer knife-edged blades serve to cut the skin on the individual grains of corn, and the teeth on the inner blades operate to free the meal and kernels from the skin, which remains with the cob. The outer knife edges operate also to scrape off the material loosened by the teeth. The teeth rising above the knife edges insure that the latter will not operate to cut the grains, skin and all, from the cob.

It will be seen that the device possesses great simplicity, and may be readily cleaned and repaired. The blades being removable and clamped in position solely by the action of the wing-nut, the whole device may be readily taken apart for washing or for replacing one or more of the blades. It will be obvious that this construction enables the blades to be readily sharpened, it being a very simple matter to remove and replace the blades prior to, and after, the sharpening operation.

What is claimed as new is:

A hand grater for green corn, comprising a U-shaped, one-piece frame whose side members are provided with apertures, a series of removable blades set edgewise and transversely within said frame, having at their ends reduced lugs engaging said openings, and being further provided with upper, incurved, cob-scraping edges, and means for drawing the free ends of the side members toward each other to clamp the blades in position.

In testimony whereof I affix my signature, in presence of two witnesses.

NANNIE McKEEVER.

Witnesses:
C. F. BRANDENBURG,
G. R. THOMAS.